United States Patent
Oh

(10) Patent No.: US 12,301,118 B2
(45) Date of Patent: May 13, 2025

(54) FORWARD MODE SOFT SWITCHING POWER CONVERTER

(71) Applicant: Apple Inc., Cupertino, CA (US)

(72) Inventor: InHwan Oh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 461 days.

(21) Appl. No.: 17/662,777

(22) Filed: May 10, 2022

(65) Prior Publication Data

US 2023/0275516 A1    Aug. 31, 2023

Related U.S. Application Data

(60) Provisional application No. 63/268,664, filed on Feb. 28, 2022.

(51) Int. Cl.
*H02M 3/335*    (2006.01)
*H02M 1/00*    (2006.01)

(52) U.S. Cl.
CPC ..... *H02M 3/33571* (2021.05); *H02M 1/0058* (2021.05)

(58) Field of Classification Search
CPC ............. H02M 1/0058; H02M 1/0054; H02M 1/0048; H02M 3/33571; H02M 3/33573; H02M 3/33576; H02M 3/337; H02M 3/33538; H02M 3/33546; H02M 3/33507
See application file for complete search history.

(56) References Cited

U.S. PATENT DOCUMENTS

| | | |
|---|---|---|
| 4,516,214 A | 5/1985 | Ray |
| 5,796,595 A | 8/1998 | Cross |
| 5,822,198 A | 10/1998 | Fraidlin et al. |
| 5,959,850 A | 9/1999 | Lim |
| 5,986,895 A * | 11/1999 | Stewart ............. H02M 3/33571 363/16 |
| 6,027,829 A | 2/2000 | Tuttle |
| 6,052,294 A | 4/2000 | Jacobs et al. |
| 6,069,807 A | 5/2000 | Boylan et al. |

(Continued)

FOREIGN PATENT DOCUMENTS

WO    2014190318 A1    11/2014

OTHER PUBLICATIONS

Chen, et al.; "Analysis and design of asymmetrical half bridge flyback converter," IEEE Proc. Electr. Power Appl., vol. 149, No. 6, Nov. 2002.

(Continued)

*Primary Examiner* — Nguyen Tran
(74) *Attorney, Agent, or Firm* — FLETCHER YODER PC

(57) ABSTRACT

A power converter can include a half bridge comprising a high side auxiliary switch and a low side main switch, the half bridge having an input coupled to a DC voltage source, a series resonant circuit coupled to the output of the half bridge, the series resonant circuit comprising a resonant capacitor and a primary winding of a transformer, an output coupled to a secondary winding of the transformer by a rectifier, the output delivering a regulated output voltage to a load, and control circuitry that operates the main switch and the auxiliary switch substantially complementarily as a forward converter with zero voltage switching of the main and auxiliary switches to regulate the output voltage delivered to the load.

19 Claims, 6 Drawing Sheets

(56) References Cited

U.S. PATENT DOCUMENTS

| | | |
|---|---|---|
| 6,218,896 B1 | 4/2001 | Becker et al. |
| 6,248,473 B1 | 6/2001 | Lonsberry |
| 7,070,881 B2 | 7/2006 | Kishiyama et al. |
| 7,724,555 B1 | 5/2010 | Simopoulos |
| 8,211,567 B2 | 7/2012 | Hori et al. |
| 8,503,199 B1 | 8/2013 | Chapuis et al. |
| 8,568,915 B2 | 10/2013 | Fuhr et al. |
| 9,144,451 B2 | 9/2015 | Schall et al. |
| 9,467,054 B2 | 10/2016 | Dai et al. |
| 9,490,079 B2 | 11/2016 | So et al. |
| 9,768,700 B2 | 9/2017 | Oh et al. |
| 10,170,974 B1 | 1/2019 | Oh et al. |
| 10,218,256 B2 | 2/2019 | Oh |
| 2005/0048365 A1 | 3/2005 | Miyahisa et al. |
| 2006/0244395 A1 | 11/2006 | Taipale et al. |
| 2009/0067207 A1 | 3/2009 | Nishino |
| 2009/0290384 A1 | 11/2009 | Jungreis |
| 2013/0264886 A1 | 10/2013 | Nakatani et al. |
| 2013/0329470 A1 | 12/2013 | Stroppa et al. |
| 2014/0028092 A1* | 1/2014 | Takeshima ........ H02M 3/33507 363/16 |
| 2014/0117878 A1 | 5/2014 | Prodic et al. |
| 2014/0140113 A1 | 5/2014 | Oh |
| 2014/0177107 A1 | 6/2014 | Jang et al. |
| 2014/0197814 A1 | 7/2014 | Shi et al. |
| 2014/0247625 A1 | 9/2014 | Hosotani |
| 2014/0368167 A1 | 12/2014 | Okura et al. |
| 2015/0117062 A1* | 4/2015 | Jin ..................... H02M 1/4241 363/21.01 |
| 2015/0194897 A1 | 7/2015 | Kim et al. |
| 2016/0343997 A1 | 11/2016 | Sekiya et al. |
| 2017/0040903 A1 | 2/2017 | Chen et al. |
| 2017/0141689 A1 | 5/2017 | Hatano |
| 2017/0201183 A1 | 7/2017 | Chen |
| 2018/0123466 A1 | 5/2018 | Feldtkeller |
| 2018/0208072 A1 | 7/2018 | Annoije et al. |

OTHER PUBLICATIONS

Domenico, Francesco Di, "600W LLC Demo Board", Infineon Technologies AG, 2014.

Han, et al.; "Analysis and Measurement of Resonant Tank Current on LLC," Texas Instruments, SLUA690, Jul. 2013.

Lee, et al.; "High-Efficiency Asymmetric Forward-Flyback Converter for Wide Output Power Range," IEEE Transactions on Power Electronics, vol. 32, No. 1, Jan. 2017.

Texas Instruments, "A 90-W, High-efficiency, LLC Series-Resonant Converter with Secondary-Side Synchronous Rectification," SLUU467, Dec. 2010.

* cited by examiner

FORWARD MODE SOFT SWITCHING POWER CONVERTER

CROSS-REFERENCE TO RELATED APPLICATIONS

This application claims priority to and benefit of U.S. Provisional Application No. 63/268,664, filed Feb. 28, 2022, and entitled "FORWARD MODE SOFT SWITCHING POWER CONVERTER," which is incorporated herein by reference in its entirety for all purposes.

BACKGROUND

Electronic devices, including for example personal computers, laptop/notebook computers, tablet computers, smart phones, and their associated accessories often use AC/DC power adapters/converters to obtain power the AC mains voltage supply. This power may be for operating power of the electronic device, battery charging, delivery of power to accessories, or some combination of these. For converters used in low to moderate power levels (e.g., from about 10 W or less to about 100 W or more, flyback converters may be used as part of the adapter/converter. Exemplary flyback converters include primary resonant flyback converters, such as those disclosed in U.S. Pat. Nos. 10,170,974 and 10,218,256.

While flyback converters, including primary resonant flyback converters, have a number of features and characteristics that lend themselves to use in low to moderate power AC/DC converter applications (including, for example galvanic isolation between primary and secondary), they do require a magnetic circuit element (in the form of a flyback transformer) that can handle the full rated power of the converter. This is because the operation of a flyback converter alternately stores energy in the magnetic circuit element (when the primary switch is turned on) and then delivers energy from the magnetic circuit element to the load (when the primary switch is turned off). For magnetic circuit elements constructed using similar configurations and materials the physical size (e.g., volume) increases with the power handling requirement. Thus, increasingly larger device power requirements result in increasingly larger converter power ratings and correspondingly larger magnetic component sizes, which result in larger, heavier, and more expensive converters.

SUMMARY

It may be desirable to provide a power converter that can provide the power requirements of an electronic device with benefits of a flyback converter (such as galvanic isolation and operating efficiency), while being smaller in size, lighter in weight, and less costly. One way this can be achieved is to reduce the power handling requirements of the magnetic circuit components (e.g., the transformer), resulting in a physically smaller, lighter, and potentially less expensive device. Disclosed herein is a forward mode soft-switching AC/DC converter that is topologically similar to a primary resonant flyback converter, but operates in a forward mode, rather than a flyback mode. As a result, the power handling requirements of the magnetic component (e.g., transformer) can be reduced, thereby allowing the magnetic component to be smaller, lighter, and potentially less expensive.

A power converter can include a half bridge comprising a high side auxiliary switch and a low side main switch, the half bridge having an input coupled to a DC voltage source, a series resonant circuit coupled to the output of the half bridge, the series resonant circuit comprising a resonant capacitor and a primary winding of a transformer, an output coupled to a secondary winding of the transformer by a rectifier, the output delivering a regulated output voltage to a load, and control circuitry that operates the main switch and the auxiliary switch substantially complementarily as a forward converter with zero voltage switching of the main and auxiliary switches to regulate the output voltage delivered to the load.

The power converter can be configured so that the resonant capacitor handles more than half of the power requirement of the load and the transformer handles less than half of the power requirement of the load. The control circuitry can allow operation of the power converter at more than one input voltage. The power converter can be configured so that the resonant capacitor handles about ¾ of the converter's rated power at a first input voltage that is lower than a second input voltage, and the transformer handles about ¼ of the power converter's rated power at the first input voltage. The power converter can be configured so that the resonant capacitor handles about 90% of the converter's rated power at a second input voltage that is higher than the first input voltage, and the transformer handles about 10% of the power converter's rated power at the second input voltage.

The control circuitry can operate the main switch and the auxiliary switch through a sequence of five modes. In a first mode, the main can is turned on as a zero voltage switching event, and the auxiliary switch is off. Also in the first mode, a primary current can initially circulate in a direction that allowed zero voltage turn on of the main switch and subsequently reverses. Also in the first mode there may not be current flow from the secondary winding.

In a second mode, the main switch can be turned off, and the auxiliary switch can remain off. Also in the second mode, the primary current can reverse because of the turn off of the main switch causing a current to flow through the auxiliary switch that facilitates zero voltage turn on of the auxiliary switch. Also in the second mode, current can flow from the secondary winding to the load. In the second mode the primary current can be quasi-sinusoidal and can diverge from a substantially linear magnetizing current of the transformer.

In a third mode, the main switch can remain off, and the auxiliary switch can be turned on as a zero voltage switching event. Also in the third mode, the primary current can reverse because of the turn on of the main switch. Also in the third mode, current can continue to flow from the secondary winding to the load. In the third mode, the primary current can be quasi-sinusoidal and can continue to diverge from a substantially linear magnetizing current of the transformer, before again converging to equal the magnetizing current of the transformer.

In a fourth mode, the main switch can remain off, and the auxiliary switch can remain on. Also in the fourth mode, the primary current can decrease to a negative value that will facilitate zero voltage turn on of the main switch. Also in the fourth mode, there may not be current flow from the secondary winding to the load.

In a fifth mode, the main switch and the auxiliary switch can be off. A primary current driven by resonant operation of the resonant circuit can circulate in a direction that allows zero voltage turn on of the main switch. Also in the fifth mode, there may not be current flow from the secondary winding to the load.

A power converter can include a switching arrangement, including a main switch and an auxiliary switch, coupled to an input voltage. The power converter can further include a series resonant circuit coupled to the switching arrangement. The series resonant circuit can include a resonant capacitor and a primary winding of a transformer. The power converter can further include an output coupled to a secondary winding of the transformer by a rectifier, the output delivering a regulated output voltage to a load. The power converter can further include control circuitry that operates the main switch and the auxiliary switch substantially complementarily as a forward converter to regulate the output voltage delivered to the load. The control circuitry can cycles the main switch and the auxiliary switch through a plurality of switching modes. The plurality of switching modes can include at least one mode in which the main switch and the auxiliary switch are off, and a primary current driven by resonant operation of the resonant circuit circulates in a direction that allows zero voltage turn on of the main switch. The plurality of switching modes can also include at least one mode in which the main switch and the auxiliary switch are off, and a driven by resonant operation of the resonant circuit circulates in a direction that allows zero voltage turn on of the auxiliary switch.

The power converter can be configured so that the resonant capacitor handles more than half of the power requirement of the load and the transformer handles less than half of the power requirement of the load. The power converter can be configured so that the resonant capacitor handles about ¾ of the converter's rated power, and the transformer handles about ¼ of the power converter's rated power at an input voltage. The power converter can be configured so that the resonant capacitor handles about 90% of the converter's rated power, and the transformer handles about 10% of the power converter's rated power at an input voltage. The control circuitry can allow operation of the power converter at more than one input voltage. The converter can be an AC-DC converter and the input voltage can be a rectified AC voltage.

A method of operating a main switch and an auxiliary switch of a forward mode resonant power converter (the forward mode resonant power converter including a resonant capacitor resonating with a primary winding of a transformer), can include cycling the main switch and the auxiliary switch through a sequence of modes.

In a first mode, the main can is turned on as a zero voltage switching event, and the auxiliary switch is off. Also in the first mode, a primary current can initially circulate in a direction that allowed zero voltage turn on of the main switch and subsequently reverses. Also in the first mode there may not be current flow from the secondary winding.

In a second mode, the main switch can be turned off, and the auxiliary switch can remain off. Also in the second mode, the primary current can reverse because of the turn off of the main switch causing a current to flow through the auxiliary switch that facilitates zero voltage turn on of the auxiliary switch. Also in the second mode, current can flow from the secondary winding to the load. In the second mode the primary current can be quasi-sinusoidal and can diverge from a substantially linear magnetizing current of the transformer.

In a third mode, the main switch can remain off, and the auxiliary switch can be turned on as a zero voltage switching event. Also in the third mode, the primary current can reverse because of the turn on of the main switch. Also in the third mode, current can continue to flow from the secondary winding to the load. In the third mode, the primary current can be quasi-sinusoidal and can continue to diverge from a substantially linear magnetizing current of the transformer, before again converging to equal the magnetizing current of the transformer.

In a fourth mode, the main switch can remain off, and the auxiliary switch can remain on. Also in the fourth mode, the primary current can decrease to a negative value that will facilitate zero voltage turn on of the main switch. Also in the fourth mode, there may not be current flow from the secondary winding to the load.

In a fifth mode, the main switch and the auxiliary switch can be off. A primary current driven by resonant operation of the resonant circuit can circulate in a direction that allows zero voltage turn on of the main switch. Also in the fifth mode, there may not be current flow from the secondary winding to the load.

DETAILED DESCRIPTION

Figure 1:
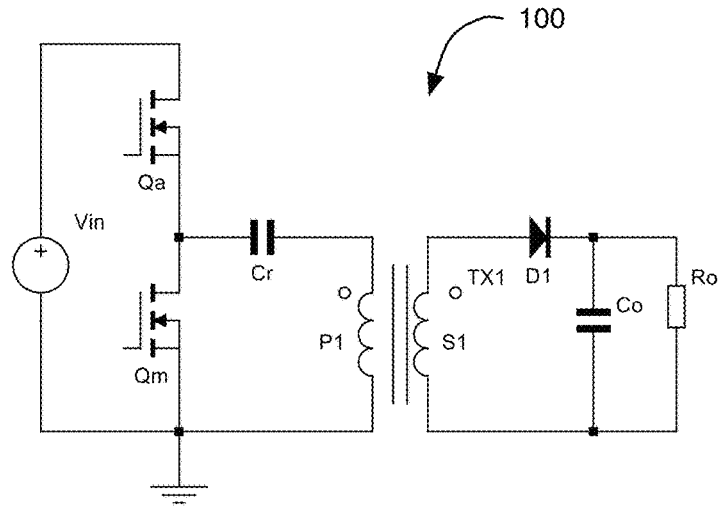
FIG. 1 illustrates a schematic diagram of a forward mode, soft switching power converter.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a schematic diagram of a forward mode, soft switching power converter 100. The converter receives a DC input voltage Vin. As described below with reference to FIG. 10, this DC input voltage Vin may be a rectified AC voltage, such as an AC mains voltage. The input voltage may be applied to a half bridge switching arrangement including a main/low side switching device Qm and an auxiliary/high side switching device Qa. Main switch Qm and auxiliary switch Qa may be operated substantially complementarily, that is, the main switch Qm may be turned on when the auxiliary switch Qa is turned off and vice-versa, except that there may be a short dead time between turn off of one switch and turn on of the other to prevent short circuiting the input. The switching devices are described herein as metal oxide semiconductor field effect transistors (MOSFETs), which are commonly used in power applications such as switching power supplies. The MOSFETs can be formed from any suitable semiconductor technology, including silicon, silicon carbide (SiC), gallium nitride (GaN), etc. Alternatively, other switching device types (e.g., bipolar junction transistors (BJTs), insulated gate bipolar transistors (IGBTs), etc.) could be used if appropriate for a given application. In cases in which switching devices lacking intrinsic body diodes are used, zero voltage switching as described herein may be achieved by including suitable diodes connected in anti-parallel with such switching devices.

Coupled to the midpoint of the half bridge, i.e., the junction between high-side/auxiliary switch Qa and low-side/main switch Qm is series resonant circuit including a series resonant capacitor Cr and an inductance in the form of primary winding P1 of a transformer TX1. Primary winding P1 is magnetically coupled to secondary winding S1 of transformer TX1, which connects via a rectifier diode D1 to an output filter capacitor Co and a load Ro. In some applications, rectifier diode D1 may be replaced with an active/synchronous rectifier to improve operating efficiency. The above described circuitry is topologically similar to a primary resonant flyback converter as described in the U.S. Patents described above, but differs in that the polarity of the secondary winding is reversed with respect to a flyback converter. Thus, converter 100 operates as a forward converter rather than a flyback converter. Such operation is described below with reference to FIGS. 2A-7B, which illustrates respective switching modes (states) of the forward mode soft switching AC-DC converter, and FIG. 8, which depict various waveforms illustrating operation of the converter.

Figure 2A:
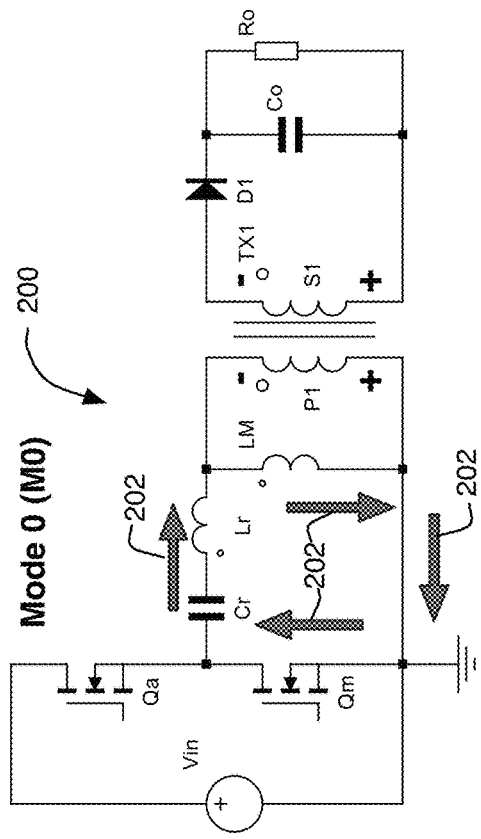
FIGS. 2A-2B illustrate a first switching mode (state) of a forward mode, soft switching power converter.
Figure 2B:
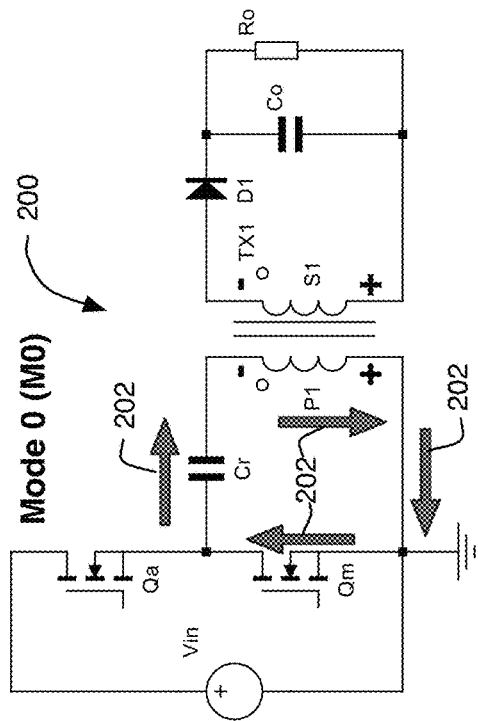

FIGS. 2A-2B illustrate a "zero-th" switching mode (state) of a forward mode, soft switching power converter. This zero-th state corresponds to the final mode/state of the following sequence, but is described first to provide the initial conditions for the first mode discussed below with respect to FIGS. 3A-3B. FIG. 2A schematically depicts the actual circuit components of converter 200 in Mode 0 (M0). FIG. 2B illustrates an alternative schematic in which the depiction of primary winding P1 of transformer TX1 has been expanded to include a leakage inductance Lr and a magnetizing inductance $L_M$. These inductances are not actual physical inductors, but rather are circuit models of intrinsic magnetic properties of transformer TX1. With the leakage inductance and magnetizing inductances separated, the remaining primary winding P1 is an "ideal" transformer winding.

As Mode 0 (M0) begins, main switch Qm and auxiliary switch Qa are both turned off. A circulating current 202 is flowing in the illustrated direction as a result of the end of Mode 5 (M5) of the previous operating cycle (discussed in greater detail below with reference to FIGS. 7A-7B). This circulating current is being driven by resonant operation of the series resonant circuit including resonant capacitor Cr and the inductor that is primary winding P1 of transformer TX1. As shown more clearly in FIG. 2B, circulating current 202 is flowing through magnetizing inductance $L_M$ from negative to positive voltage—meaning that circulating current 202 is de-magnetizing transformer TX1. In other words, some amount of energy stored in the magnetic field of transformer TX1 is being discharged. On the secondary side, the corresponding polarity of the voltage across secondary winding S1 is such that rectifier D1 is reverse biased, meaning that no current is delivered to the load Ro from secondary winding S1. Thus, load Ro will draw current from output filter capacitor Co.

Circulating current 202 also flows through forward biased intrinsic body diode of main switch Qm. The effect of this current is to discharge the drain-to-source capacitance of main switch Qm, thereby allowing main switch Qm to be turned on as a zero voltage switching (ZVS) event, which reduces switching losses for the converter. In other words, energy is being drawn from the magnetic field of transformer TX1 to facilitate ZVS turn on of main switching device Qm.

Figure 7A:
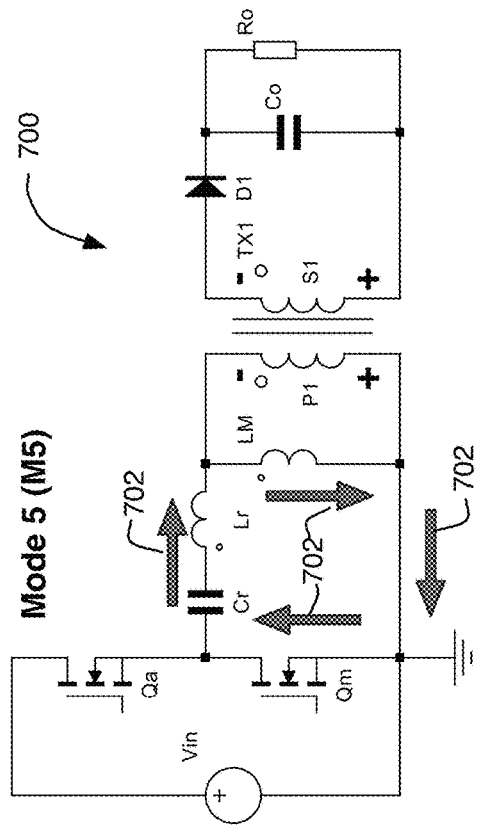
FIGS. 7A-7B illustrate a sixth switching mode (state) of a forward mode, soft switching power converter.
Figure 7B:
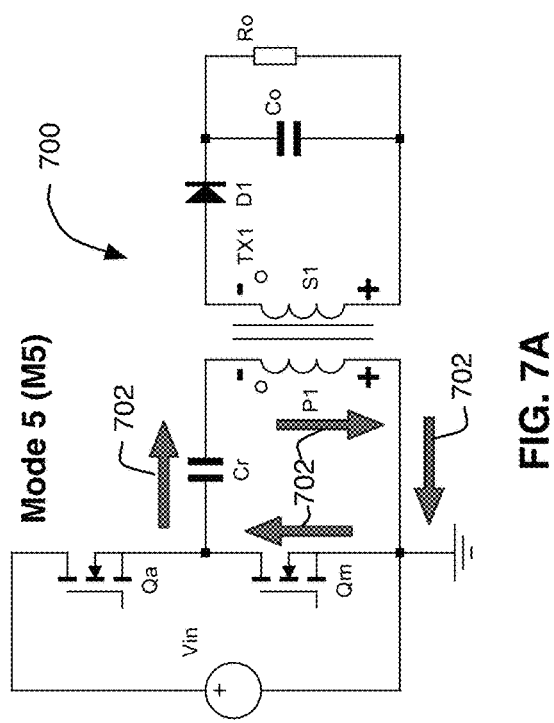
Figure 8:
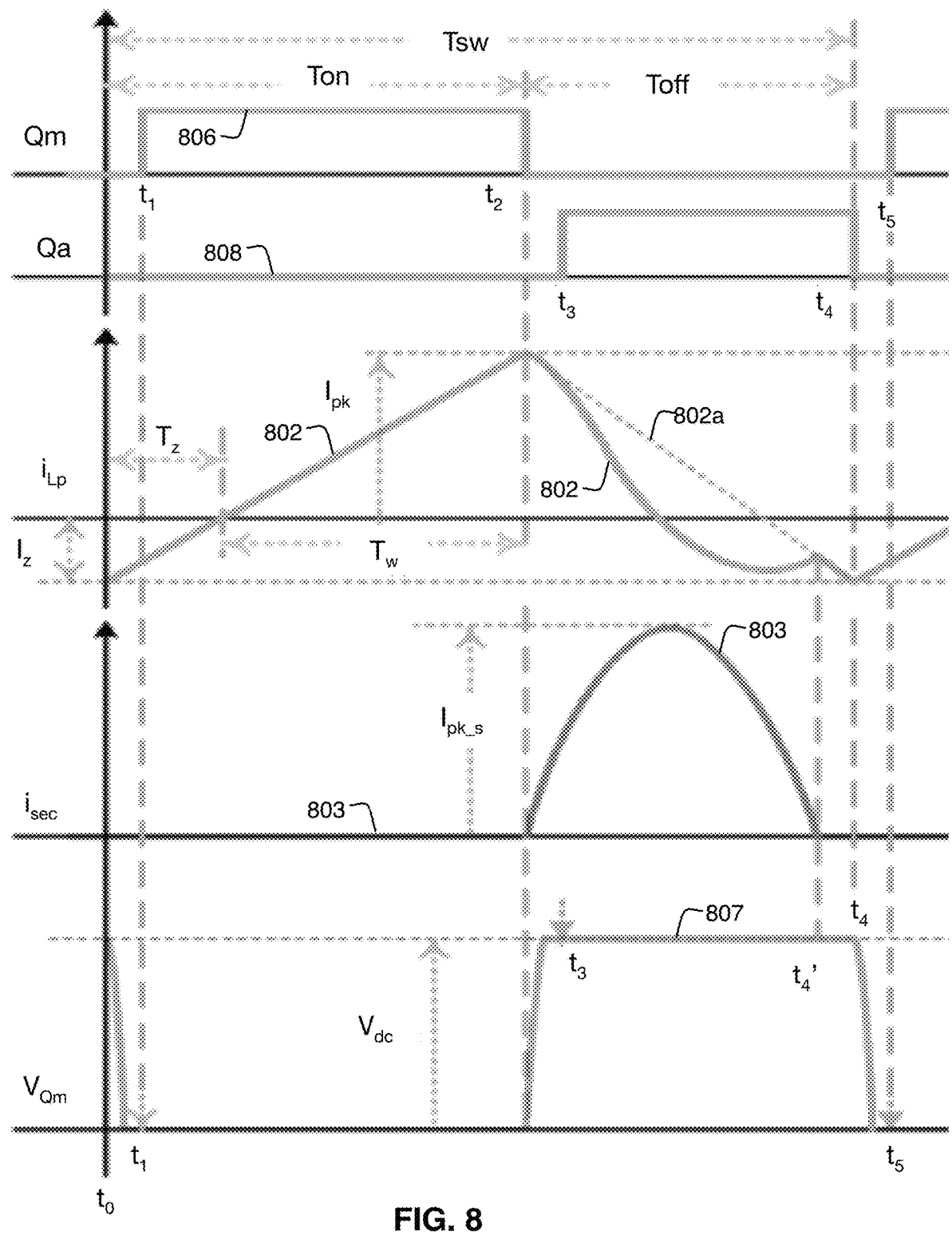
FIG. 8 illustrates a series of waveforms corresponding to the first through sixth switching modes (states) of a forward mode, soft switching power converter.

Turning to FIG. 8, Mode 0 (M0) corresponds to the interval from t0 (the y-axis) until time $t_1$. Waveforms 806 and 808 depict the drive signals for switches Qm and Qa, respectively. During M0, both main switch Qm and auxiliary switch Qa are turned off. Waveform 802 illustrates the primary winding current flowing through primary winding P1 of transformer TX1. As illustrated, current 802 is negative, and starts M0 at a level Iz, which corresponds to the current required to achieve zero voltage switching. Waveform 803 illustrates the secondary winding current, which is zero for the duration of M0. Finally, waveform 807 depicts the voltage VQm, which is the drain-to-source voltage appearing across main switch Qm. As illustrated, this voltage is decreasing from the DC bus voltage Vdc (corresponding to Vin) to zero during Mode 0 (M0), illustrating the discharge of drain-to-source capacitance of switch Qm, as discussed above. Voltage VQm may reach zero before time $t_1$, i.e., the time at which main switch Qm is turned on as a zero voltage switching event. In other words, main switch Qm need not be turned on instantly when VQm reaches zero, but the turn on may be delayed relative to the turn off of auxiliary switch Qa from Mode 6 (M6) of the preceding cycle (discussed in greater detail below with reference to FIG. 7). In some embodiments, there may be a fixed dead time between t0 (the point at which auxiliary switch Qa was turned off in the preceding Mode 6 (M6)) and t1 (the point at which main switch Qm is turned on, initiating Mode 1 (M1)).

Figure 3A:
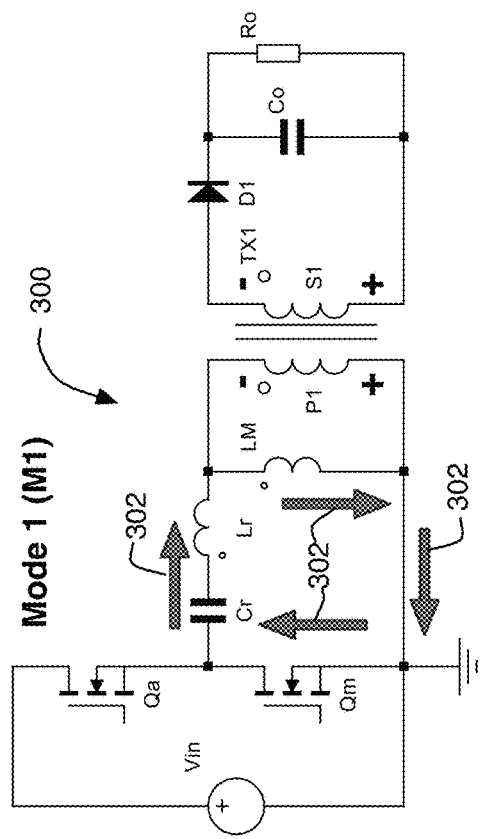
FIGS. 3A-3B illustrate a second switching mode (state) of a forward mode, soft switching power converter.
Figure 3B:
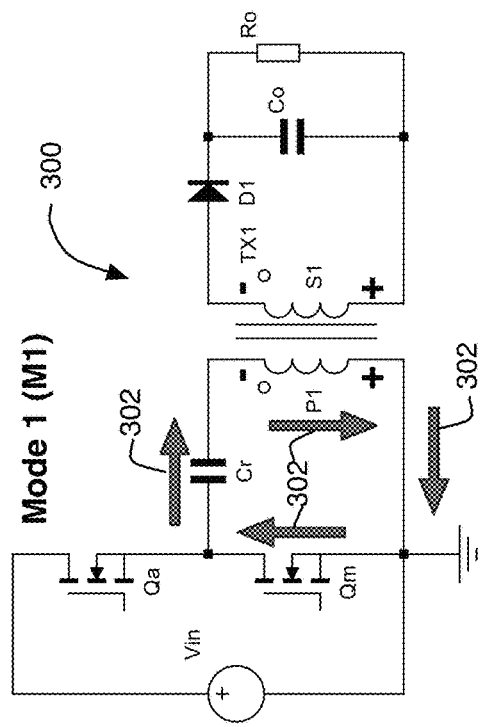

FIGS. 3A-3B illustrate a first switching mode (state) of a forward mode, soft switching power converter. As with FIGS. 2A-2B, FIG. 3A schematically depicts the actual circuit components of converter 300 in Mode 1 (M1), and FIG. 2B illustrates an alternative schematic in which the depiction of primary winding P1 of transformer TX1 has been expanded to include the leakage inductance Lr and magnetizing inductance $L_M$ of transformer TX1. To begin Mode 1 (M1), main switch Qm is turned on while auxiliary switch Qa remains turned off. Circulating current 302 continues flowing in the illustrated direction as a result of the end of Mode 0 (M0) discussed above. This circulating current remains being driven by resonant operation of the series resonant circuit including resonant capacitor Cr and the inductor that is primary winding P1 of transformer TX1. As shown more clearly in FIG. 3B, circulating current 302 is flowing through magnetizing inductance $L_M$ from negative to positive voltage—meaning that circulating current 302 is continuing to de-magnetize transformer TX1. In other words, some amount of energy stored in the magnetic field of transformer TX1 is being discharged. On the secondary side, the corresponding polarity of the voltage across secondary winding S1 is such that rectifier D1 is reverse biased, meaning that no current is delivered to the load Ro from secondary winding S1. Thus, load Ro will draw current from output filter capacitor Co.

Turning to FIG. 8, Mode 1 (M1) corresponds to the interval from t1 until time t2, when main switch Qm is turned off, beginning Mode 2 (M2). As noted above, waveforms 806 and 808 depict the drive signals for switches Qm and Qa, respectively, and during M1, main switch Qm is turned on and auxiliary switch Qa is turned off. Waveform 802 illustrates the primary winding current flowing through primary winding P1 of transformer TX1. As illustrated, current 802 begins negative at time T1 at an absolute value less than Iz. At time Tz, the primary current reverses, due to resonant operation of the series resonant circuit. For the duration of Mode 1 (for time Tw) current 302 is discharging resonant capacitor Cr, re-magnetizing transformer TX1. Thus, during time interval Tw of Mode 1 (M1), the Waveform 803 illustrates the secondary winding current, which is zero for the duration of M1, because rectifier D1 remains reverse biased. Finally, waveform 807 depicts the voltage VQm, which is the drain-to-source voltage appearing across main switch Qm. As illustrated, this voltage is zero because main switch Qm is turned on.

Figure 4A:
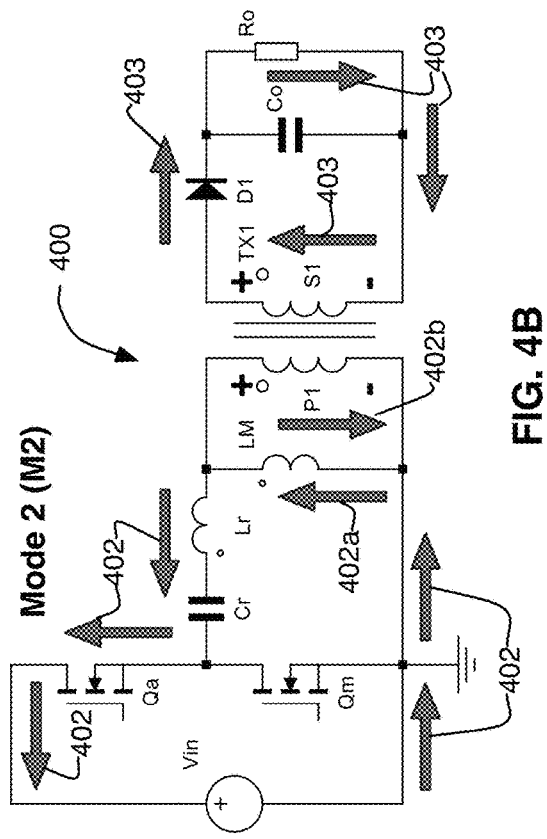
FIGS. 4A-4B illustrate a third switching mode (state) of a forward mode, soft switching power converter.
Figure 4B:
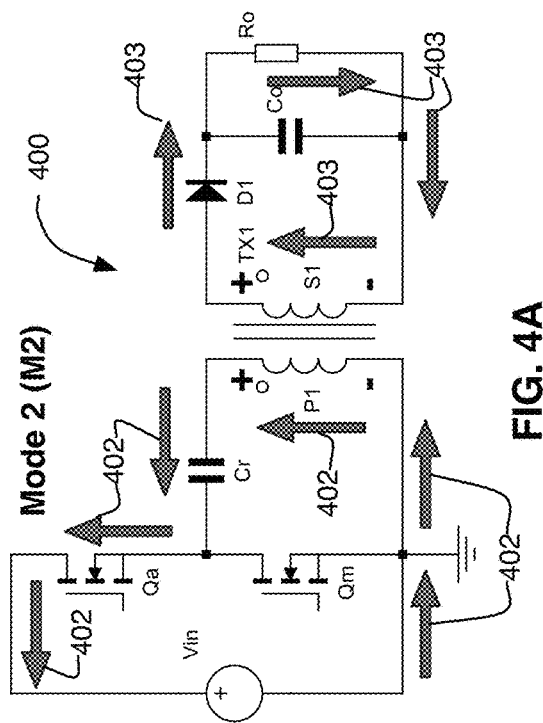

FIGS. 4A-4B illustrate a second switching mode (state) of a forward mode, soft switching power converter. As with FIGS. 2A-3B, FIG. 4A schematically depicts the actual circuit components of converter 400 in Mode 2 (M2), and FIG. 4B illustrates an alternative schematic in which the depiction of primary winding P1 of transformer TX1 has been expanded to include the leakage inductance Lr and magnetizing inductance $L_M$ of transformer TX1. To begin Mode 2 (M2), main switch Qm and auxiliary switch Qa are turned off. Mode 2 (M2) continues until auxiliary switch Qa is turned on, beginning Mode 3 (M3). During Mode 2, the primary current 402/802 begins to diverge from the transformer magnetizing current 402/802a as described in greater detail below.

Turning off main switch Qm causes primary current 402 (which, as discussed above, has reversed direction during M1) to flow back to the DC bus/input source Vin. This current path passes through the intrinsic body diode of auxiliary switch Qa, will allows for turn on of auxiliary switch Qa as a ZVS switching event at time t3, which begins Mode 3 (M3). Primary current 402 is still being driven by resonant operation of the series resonant circuit including resonant capacitor Cr and the inductor that is primary winding P1 of transformer TX1, and more specifically, by resonance between resonant capacitor Cr and transformer leakage inductance Lr. Turning off main switch Qm causes primary current 402 to transition from increasing to decreasing, which causes the voltage polarity across primary winding P1 to reverse. (The voltage across an inductor is proportional to the rate of change of current across the inductor.) The polarity reversal of the voltage across primary winding P1 corresponds to a corresponding voltage polarity reversal across the secondary winding S1. This allows secondary current 403 to flow on the secondary side, because rectifier D1 is now forward biased. Thus, load Ro (and filter capacitor Co) can draw current 403 from secondary winding $S_1$.

As shown more clearly in FIG. 4B, (de)magnetizing current 402a is flowing through transformer magnetizing inductance $L_M$ from negative to positive voltage—meaning that magnetizing current 402a is de-magnetizing transformer TX1. In other words, some amount of energy stored in the magnetic field of transformer TX1 is being discharged. Back on the primary side, primary current 402 may be thought of as having two components in the parallel portion of the primary winding equivalent circuit that includes magnetizing inductance $L_M$ and ideal primary winding P1. Magnetizing current 402a may be thought of as flowing through the magnetizing inductance $L_M$, and hypothetical current 402b may be thought of as flowing through ideal primary winding P1. Hypothetical current 402b is thus proportional to secondary current 403 as determined by the turns ratio of the transformer. As noted above, neither magnetizing inductance 402a nor ideal winding P1 is an actual component, but rather they—together with leakage inductance Lr—represent in equivalent circuit form the underlying physics of transformer TX1. The sum of magnetizing current 402a and hypothetical current 402b (arithmetically a difference because of the sign/direction of the currents) is the net primary current 402. Said another way, the demagnetizing current 402a is equal to the sum of the primary current 402 (corresponding to energy delivered to the DC input) and the current 402b, which is the reflected secondary current 403 (corresponding to energy delivered to the load).

Turning to FIG. 8, Mode 2 (M2) corresponds to the interval from t2, when main switch Qm is turned off, until time t3 when auxiliary switch Qa is turned on, beginning Mode 3 (M3). As noted above, waveforms 806 and 808 depict the drive signals for switches Qm and Qa, respectively, and during M2, main switch Qm and auxiliary switch Qa are turned off. Waveform 802 illustrates the net primary winding current flowing through primary winding P1 of transformer TX1. Waveform 802a illustrates the demagnetizing current 802a of transformer TX1. As illustrated, primary current 802 begins M2 at its peak value Ipk, and reverses direction, thus beginning to decrease and to diverge from magnetizing current 802a. This divergence is driven by the difference in the substantially higher resonant frequency determined by resonant capacitor Cr and leakage inductance Lr as compared to the substantially slower charge/discharge of transformer TX1. Finally, waveform 807 depicts the voltage VQm, which is the drain-to-source voltage appearing across main switch Qm. As illustrated, this voltage begins increasing from zero because main switch Qm is turned off, reaching the DC bus voltage Vdc before auxiliary switch Qa turns on (again illustrating ZVS operation of auxiliary switch Qa).

Figure 5A:
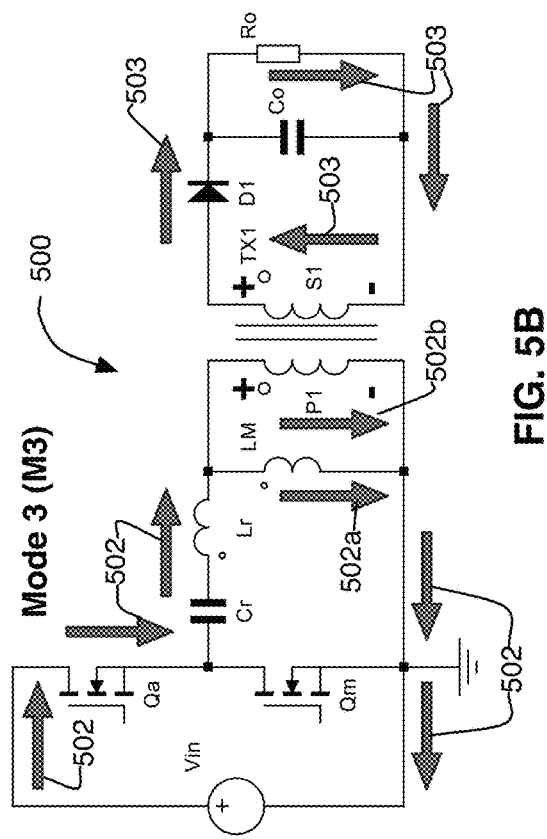
FIGS. 5A-5B illustrate a fourth switching mode (state) of a forward mode, soft switching power converter.
Figure 5B:
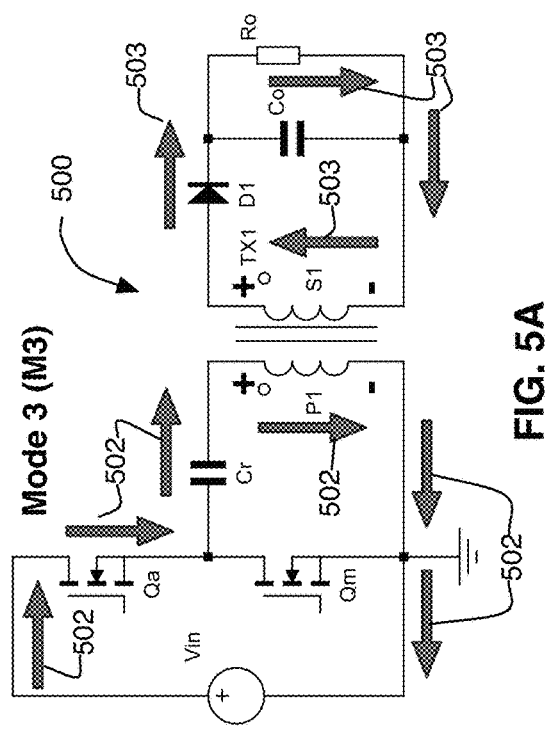

FIGS. 5A-5B illustrate a third switching mode (state) of a forward mode, soft switching power converter. As with FIGS. 2A-4B, FIG. 5A schematically depicts the actual circuit components of converter 500 in Mode 3 (M3), and FIG. 5B illustrates an alternative schematic in which the depiction of primary winding P1 of transformer TX1 has been expanded to include the leakage inductance Lr and magnetizing inductance $L_M$ of transformer TX1. To begin Mode 3 (M3), main switch Qm remains turned off, and auxiliary switch Qa is turned off. Mode 3 (M3) continues until time t4' when the primary current 502 again equals transformer (de) magnetizing current 502a, which also corresponds to when secondary current 503 reaches zero. During Mode 3, the resonating quasi-sinusoidal primary current 502/802 initially continues to diverge from the transformer magnetizing current 502/802a before then converging as described in greater detail below.

Turning on auxiliary switch Qa reverses the primary current, resulting in primary current 502 flowing from DC bus/DC input Vin as illustrated in FIGS. 5A and 5B. Primary current 502 is now being driven in part by Vin as well as (in part) by resonant operation resonant capacitor Cr and primary winding P1. Primary current 502 flows into the positive voltage terminal of primary winding P1. This causes a proportional secondary current 503, with the ratio being determined by the turns ratio of transformer TX1, i.e., the ratio of the number of turns in primary winding P1 to the number of turns in secondary winding S1. Secondary current 503 can continue to flow on the secondary side, because rectifier D1 remains forward biased. Thus, load Ro (and filter capacitor Co) can draw current 403 from secondary winding S1.

As shown more clearly in FIG. 5B, magnetizing current 502a is flowing through transformer magnetizing inductance $L_M$ from positive to negative voltage—meaning that magnetizing current 502a is (re-)magnetizing transformer TX1. In other words, some additional amount of energy is being stored in the magnetic field of transformer TX1 beyond what is being delivered to load Ro via secondary winding S1. As discussed above, primary current 502 may be thought of as having two components in the parallel portion of the primary winding equivalent circuit that includes magnetizing inductance $L_M$ and ideal primary winding P1. Magnetizing current 502a may be thought of as flowing through the magnetizing inductance Lm $L_M$ and hypothetical current 502b may be thought of as flowing through ideal primary winding P1. Hypothetical current 502b is thus proportional to secondary current 503 as determined by the turns ratio of the transformer. As noted above, neither magnetizing inductance 502a nor ideal winding P1 is an actual component, but rather they—together with leakage inductance Lr—represent in equivalent circuit form the underlying physics of transformer TX1. The sum of magnetizing current 502a and hypothetical current 502b is the net primary current 502. Said another way, the magnetizing current 502a is equal to the difference between the primary current 502 (corresponding to energy delivered from the DC input) and the current 502b, which is the reflected secondary current 503 (corresponding to energy delivered to the load).

Turning to FIG. 8, Mode 3 (M3) corresponds to the interval from t3, when auxiliary switch Qa is turned on, until time t4' when primary current 802 and transformer magnetizing 802a converge, which corresponds to secondary current 803 reaching zero. This time t4' is also just before auxiliary switch Qa is turned off at time t4. As noted above, waveforms 806 and 808 depict the drive signals for switches Qm and Qa, respectively, and during M3, main switch Qm is turned off, and auxiliary switch Qa is turned on. Waveform 802 illustrates the net primary winding current flowing through primary winding P1 of transformer TX1. Waveform 802a illustrates the magnetizing current 802a of transformer TX1. As illustrated, primary current 802 begins M3 just below its peak value Ipk at the beginning of M2 and continues decreasing in a quasi-sinusoidal fashion before slightly increasing to re-converge with magnetizing current 802a. As described above, this divergence is driven by the difference in the substantially higher resonant frequency determined by resonant capacitor Cr and leakage inductance Lr as compared to the substantially slower charge/discharge of transformer TX1. Waveform 803 depicts the secondary current, which is sinusoidal, decreasing to zero at the end of M3. Finally, waveform 807 depicts the voltage VQm, which is the drain-to-source voltage appearing across main switch Qm. As illustrated, this voltage remains at the DC bus voltage Vdc throughout M3.

Figure 6A:
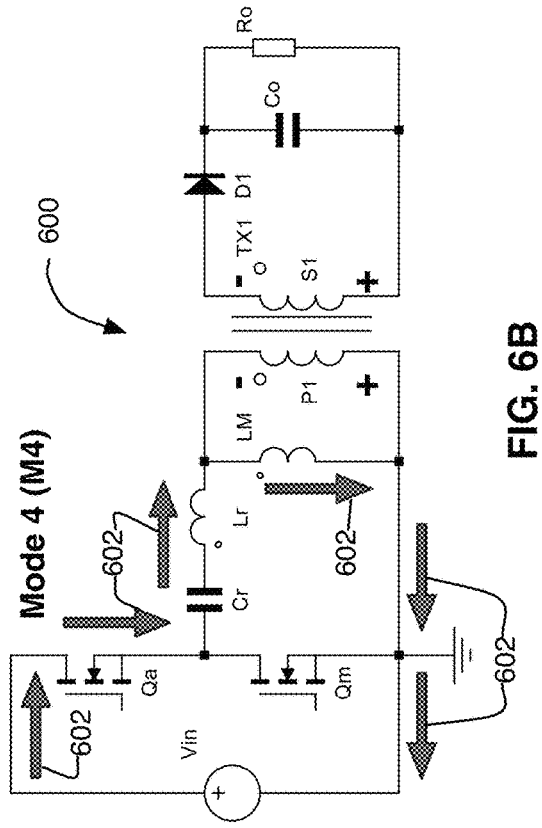
FIGS. 6A-6B illustrate a fifth switching mode (state) of a forward mode, soft switching power converter.
Figure 6B:
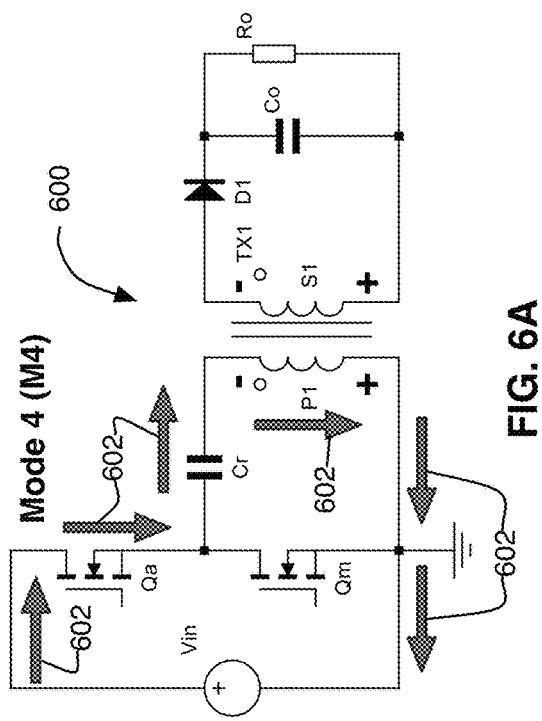

FIGS. 6A-6B illustrate a fourth switching mode (state) of a forward mode, soft switching power converter. As with FIGS. 2A-5B, FIG. 6A schematically depicts the actual circuit components of converter 600 in Mode 4 (M4), and FIG. 6B illustrates an alternative schematic in which the depiction of primary winding P1 of transformer TX1 has been expanded to include the leakage inductance Lr and magnetizing inductance $L_M$ of transformer TX1. Mode 4 begins at time t4' discussed above, which is when the primary current 602 again equals transformer magnetizing current 602a, which also corresponds to when secondary current 603 reaches zero. To begin Mode 4 (M4), main switch Qm remains turned off, and auxiliary switch Q3 remains turned on. Mode 4 (M4) continues until time t4 when auxiliary switch Qa is turned off. During Mode 4, primary current 602/802 has converged with magnetizing current 802, the voltage polarities across transformer windings P1 and S1 have reversed, and secondary current flow is blocked because rectifier D1 is again reverse biased. Primary current 602 flows from DC bus/input Vin into the now negative voltage terminal of primary winding P1. Thus, load Ro must draw current from filter capacitor Co. As shown more clearly in FIG. 6B, magnetizing current 602 is flowing through transformer magnetizing inductance $L_M$ from negative to positive voltage—meaning that this current is again demagnetizing transformer TX1. In other words, some additional amount of energy is being discharged from the magnetic field of transformer TX1. This energy is being stored in resonant capacitor Cr.

Turning to FIG. 8, Mode 4 (M4) corresponds to the interval from t4', when primary current 802 and transformer magnetizing 802a converge, which corresponds to secondary current 803 reaching zero, until time t4 when auxiliary switch Qa is turned off. Thus Mode 4 is a relatively short transition interval. As noted above, waveforms 806 and 808 depict the drive signals for switches Qm and Qa, respectively, and during M4, main switch Qm is turned off, and auxiliary switch Qa is turned on (until being turned off at t4, i.e., the end of M4). Waveform 802 illustrates the primary winding current flowing through primary winding P1 of transformer TX1. Waveform 803 depicts the secondary current, which is again zero. Finally, waveform 807 depicts the voltage VQm, which is the drain-to-source voltage appearing across main switch Qm. As illustrated, this voltage remains at the DC bus voltage Vdc throughout M4.

FIGS. 7A-7B illustrate a fifth switching mode (state) of a forward mode, soft switching power converter, which corresponds to the "zero-th" mode (Mode 0/M0) discussed above. As with FIGS. 2A-6B, FIG. 7A schematically depicts the actual circuit components of converter 700 in Mode 5 (M5), and FIG. 7B illustrates an alternative schematic in which the depiction of primary winding P1 of transformer TX1 has been expanded to include the leakage inductance Lr and magnetizing inductance $L_M$ of transformer TX1. Mode 5 begins at time t4 when auxiliary switch Qa is switched off and continues until time t5, when main switch Qm is turned on, corresponding to time t1 and the beginning Mode 0, discussed above. In Mode 5 (M5), main switch Qm and auxiliary switch Qa are both turned off. During Mode 5, primary current 702/802, driven by resonant operation of resonant capacitor Cr and primary winding P1, is circulating on the primary side through the intrinsic body diode of main switch Qm. This will facilitate turn on of main switch Qm as a ZVS event, as described above with respect to Mode 0 and FIGS. 2A-2B. As illustrated in FIGS. 7A-7B, the voltage polarities across transformer windings P1 and S1 remain reversed, and secondary current flow remains blocked because rectifier D1 remains reverse biased. Thus, load Ro must draw current from filter capacitor Co. As shown more clearly in FIG. 7B, magnetizing current 702 is flowing through transformer magnetizing inductance $L_M$ from negative to positive voltage—meaning that this current is again demagnetizing transformer TX1. In other words, some additional amount of energy is being discharged from the magnetic field of transformer TX1. This energy is being stored in resonant capacitor Cr and/or used to achieve the main switch Qm zero voltage turn on.

Turning to FIG. 8, Mode 5 (M5) corresponds to the interval from time t4 when auxiliary switch Qa is turned off until time t5/t1 when main switch Qm is turned on, beginning Mode 0 (M0). Thus Mode 5 is also a relatively short transition interval. As noted above, waveforms 806 and 808 depict the drive signals for switches Qm and Qa, respectively. During M5, main switch Qm and auxiliary switch Qa are turned off. Waveform 802 illustrates the primary winding current flowing through primary winding P1 of transformer TX1. Waveform 803 depicts the secondary current, which is again zero. Finally, waveform 807 depicts the voltage VQm, which is the drain-to-source voltage appearing across main switch Qm. As illustrated, this voltage begins at the DC bus voltage Vdc, but decreases throughout M5 by virtue of current 702 flowing through the intrinsic body diode and discharging the drain-to-source capacitance of main switch Qm. This facilitates turn on of main switch Qm as a ZVS transition.

FIG. 8 illustrates a series of waveforms corresponding to the first through sixth switching modes (states) of a forward mode, soft switching power converter and was discussed above in conjunction with FIGS. 2A-7B.

The forward mode, soft switching power converter described with reference to FIGS. 1-8B is topologically similar to a primary resonant flyback converter, but operates in a forward mode rather than in a flyback mode. In a flyback converter, the magnetic component (i.e., the flyback transformer) must be sized to have a power handing capability equal to the power rating of the converter. This is because the flyback mode of operation includes alternating cycles during which power is alternately stored in and discharged from the flyback transformer. Conversely, in the forward mode, soft switching power converter described above resonant capacitor Cr shares the power handling duties with the magnetic component (i.e., transformer TX1). Thus, transformer TX1 need not be rated for the entire power rating of the converter. Reducing the power handling requirement of transformer TX1 allows for a physically smaller and potentially less expensive transformer, leading in turn to a smaller and potentially less expensive converter.

Increased power handling requirements for resonant capacitor Cr may result in a physically larger capacitor than in a primary resonant flyback converter. However, depending on the operating voltage, capacitive energy storage can be more volumetrically efficient than magnetic energy storage. In other words, capacitors can have a higher energy/power density than magnetic circuit elements, such as transformers. Thus, for a converter operating as above, shifting a significant portion of the power handling requirements to resonant capacitor Cr does not increase the physical size of resonant capacitor Cr as much as it reduces the physical size of transformer TX1. This allows for significant size reduction of the converter (and also potentially reduced costs), particularly if half or more than half of the converter's power handling requirement is handled by resonant capacitor Cr.

Figure 9:
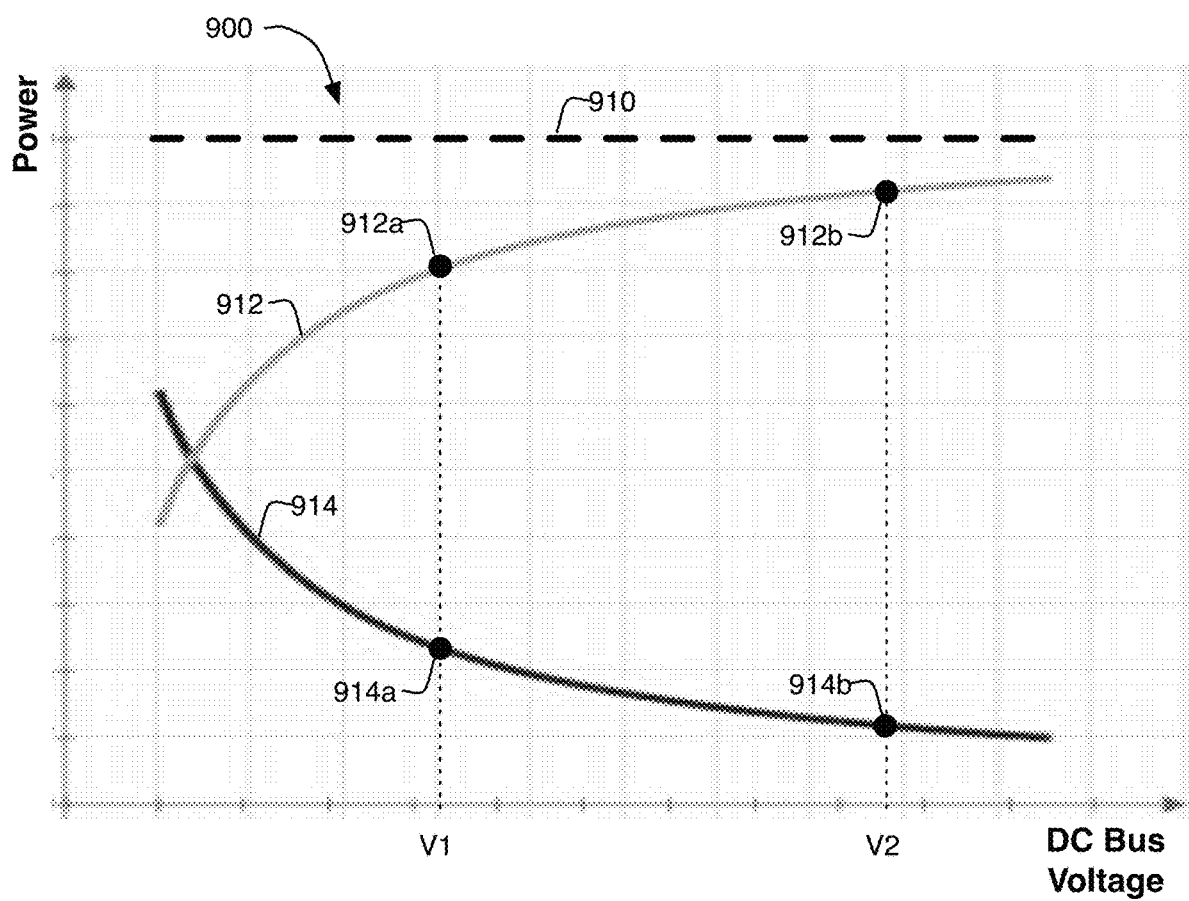
FIG. 9 illustrates a plot of power handling for a resonant capacitor and a transformer of a forward mode, soft switching power converter.

FIG. 9 illustrates a plot 900 of power handling versus DC bus voltage (which corresponds to input voltage) for an exemplary resonant capacitor and a transformer of a forward mode, soft switching power converter. The converter has a maximum power rating corresponding to horizontal dashed line 910. This can be any value, depending on the power requirements of the load to be powered by the converter. As noted above, a forward mode soft switching converter as discussed herein may be particularly advantageous in a moderate power range from about 10 W (or below) to about 100 W (or above). If such converter power handling requirements were implemented using a flyback converter, the flyback transformer would need to be designed for this level of power handling. However, the forward mode soft switching converter described above can have the illustrated power handling split between resonant capacitor Cr, illustrated by curve 912, and transformer TX1, illustrated by curve 914. The energy stored in a capacitor is proportional to the square of the voltage across the capacitor. Thus, the amount of converter load handled by resonant capacitor Cr, illustrated by curve 912, increases in proportion to the square root of the DC bus voltage. Correspondingly, the amount of converter load handled by transformer TX1, illustrated by curve 914, decreases in proportion to the square root of the DC bus voltage.

For an AC/DC converter, the DC bus voltage will be determined by the AC input voltage. For example DC bus voltage V1 could be ~163 Vdc, corresponding to an RMS AC input voltage of 115V. Similarly DC bus voltage V2 could be ~325 Vdc, corresponding to an RMS AC input voltage of 240V. When operating at voltage V1, approximately ¾ of the power handling requirement is met by resonant capacitor Cr, corresponding to point 912a on capacitor power handling curve 912. Correspondingly, approximately ¼ of the power handling requirement is met by transformer TX1, corresponding to point 914a on transformer power handling curve 914. When operating at voltage V2, approximately 90% of the power handling requirement can be meet by resonant capacitor Cr, corresponding to point 912b on capacitor power handling curve 912. Correspondingly, approximately 10% of the power handling requirement can be meet by transformer TX1, corresponding to point 914b on transformer power handling curve 914.

The power handling fractions discussed above are exemplary only. The exact amount of power handled by each component will be determined by the particular power requirements and component values. Of particular significance are the capacitance of resonant capacitor Cr and the leakage inductance of transformer TX1. In some applications, if enough inductance cannot be provided by the transformer, an additional discrete series inductor could be provided to meet the required inductance level. Any implementation of the above-described circuit can result in a decrease in transformer power handling requirement, and thus size/cost. However, it may be advantageous to select the components such in all operating regimes, half or more of the power handling requirement is met by resonant capacitor Cr. For lower operating voltages, the converter component values could be chosen such that ½, ¾, 90%, or any other suitable fraction of the power handling capacity of the converter is provided by resonant capacitor Cr, such that ½, ¼, 10%, or any other corresponding fraction of the power handling capacity of the converter is provided by transformer TX1. The power handling minimum for resonant capacitor Cr, corresponding to power handling maximum for transformer TX1 may be selected for the lowest expected operating voltage. At higher operating voltages, the fraction of power handling provided by resonant capacitor Cr will necessarily be greater with a corresponding decrease in power handling by transformer TX1. In other cases, the component values may be selected to minimize one or more of overall system volume or overall system cost for a given operating voltage (or voltages) and power requirement. Such a design could also be modified to account for any other constraint.

Figure 10:
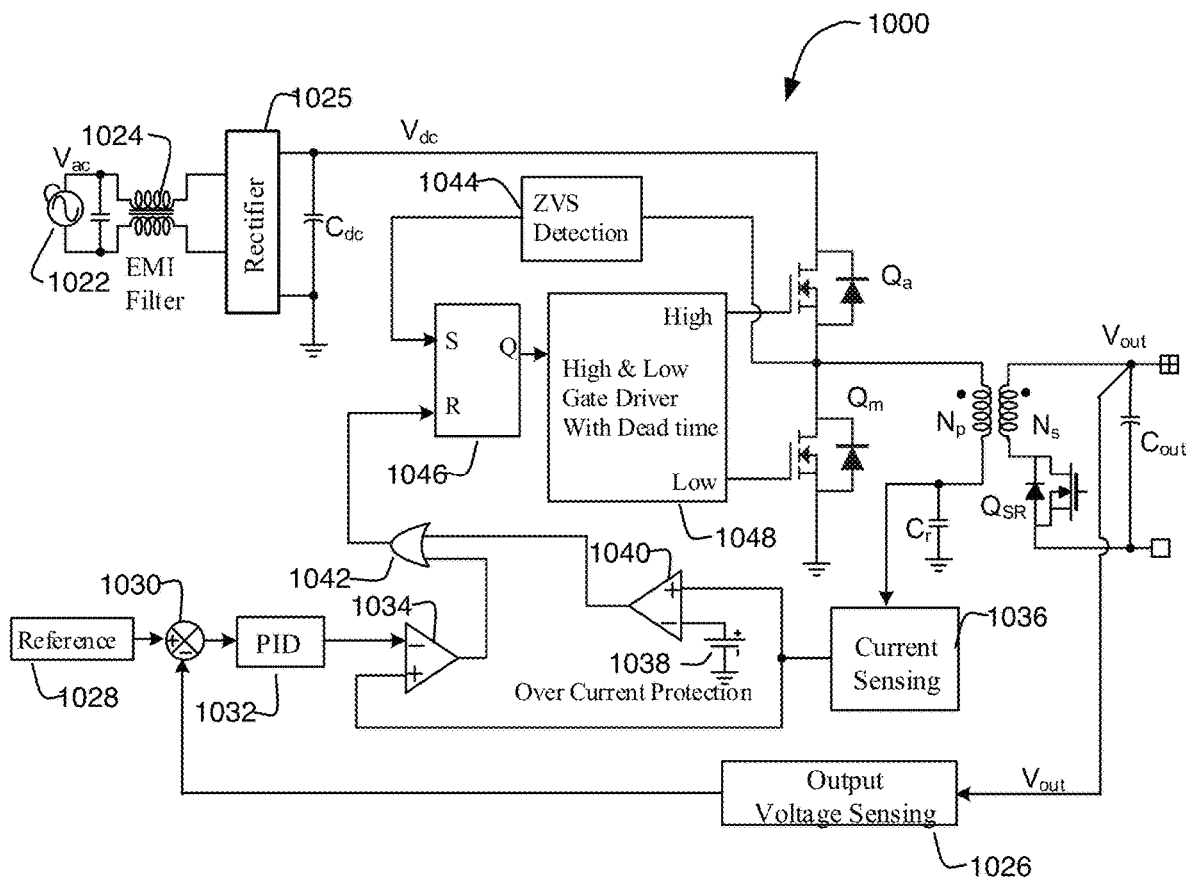
FIG. 10 illustrates a control block diagram of a forward mode, soft switching AC/DC power converter.

FIG. 10 illustrates a simplified control block diagram of a forward mode, soft switching AC/DC power converter with an exemplary control system. The power circuitry includes an AC source 1022, which may be an AC mains connection. The AC voltage may pass through an optional electromagnetic interference (EMI) filter 1024 to reach rectifier 1025. Rectifier 1025 may be any rectifier suitable for the particular application, including a half bridge or full bridge rectifier made of diodes or active switches. The output of rectifier 1025 may be a DC voltage bus Vdc, which may be supported by a DC bus capacitor Cdc. The DC bus is connected to a high side auxiliary switch Qa, as described above. Auxiliary switch Qa may, in turn be connected to a low side main switch Qm, as described above. The junction point of the main and auxiliary switches Qm and Qa may be coupled to a series resonant circuit including transformer primary winding Np (corresponding to primary winding P1, discussed above) and a resonant capacitor Cr. Transformer secondary winding Ns may be coupled to a regulated DC output (Vout) supported by an output filter capacitor Cout. This coupling can include an output rectifier, illustrated as an active/synchronous rectifier Qsr, although, as noted above, the output rectifier could also be a passive/diode rectifier.

The illustrated converter control circuitry is but one example that incorporates typical power converter control elements. Nonetheless, various elements could be omitted to the control circuit if not needed in a given application, and additional elements could be added to the control circuit if appropriate for such applications. Beginning at the output, the output voltage Vout is sensed by output voltage sensor 1026 and provided as a feedback signal to summing junction 1030. Summing junction 1030 also receives a reference input 1028, which can correspond to the desired output voltage. Summing junction may be or may include an error amplifier. The error signal is passed to a control loop, such as PID (proportional-integral-derivative) controller 1032. Control loop need not be a PID control loop, and could be, for example, a proportional (P) controller, a proportional integral (PI) controller, etc. Controller 1032 may be implemented as part of the error amplifier or could be implemented separately, including, for example, as a digital programmable controller such as a suitably programmed microcontroller, microprocessor, or by other suitably configured digital circuitry such as a field programmable gate array (FPGA), discrete or integrated logic circuits, etc.

The output of controller 1032 could be passed directly to the gate drive generating circuitry discussed below, or, in some cases, could be combined with current limiting circuitry as illustrated. More specifically, the primary side current can be sensed by current sensor 1036, which can pass the output to comparator 1034, which also receives the output of controller 1032. The relative values of the controller output and primary side current and determine whether the output of converter 1034 is a logic high or logic low, delivered to NOR gate 1042. Correspondingly, the sensed current value can be provide to overcurrent protection comparator 1040, which compares the primary side current to an overcurrent reference 1038 and generates an output that is also provided to NOR gate 1042. The combination of these signals allow NOR gate 1042 to trigger the reset pin of flipflop 1046, which is coupled to gate drive circuitry 1048. The set pin of flipflop 1046 can be coupled to ZVS detection block 1044, which can receive an input from the junction/output of the switching half bridge made up of auxiliary switch Qa and main switch Qm. ZVS detection circuit 1044 and NOR gate 1042 (from the voltage feedback and current sensing loop) in combination cause flipflop 1046 to toggle to provide trigger signals to gate drive circuit 1048. Gate drive circuit 1048 can include logic that generates gate drive signals for high side/auxiliary switch Qa and low side/main switch Qm from the received trigger signal output from flipflop 1046. Gate drive circuit 1048 can also implement the fixed dead time between turn off and turn on of the substantially complementarily operating switches.

Again, the above-described controller is merely an exemplary high level description of one potential control arrangement. These and other functions can be provided in any form appropriate to a given application, including integrating these and other functions into a single integrated circuit, which could also include switching devices Qa and Qm.

The foregoing describes exemplary embodiments of a forward mode soft switching converter, which may be used as part of an AC/DC converter. Such systems may be used in a variety of applications but may be particularly advantageous when used in conjunction with portable electronic devices including, but not limited to, laptop computers, tablet computers, mobile phones, and their associated accessories. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power converter comprising:
 a half bridge comprising a high side auxiliary switch and a low side main switch, the half bridge having an input coupled to a DC voltage source;
 a series resonant circuit coupled to an output of the half bridge, the series resonant circuit comprising a resonant capacitor and a primary winding of a transformer;
 an output coupled to a secondary winding of the transformer by a rectifier, the output delivering a regulated output voltage to a load; and
 control circuitry that operates the main switch and the auxiliary switch substantially complementarily as a forward converter with zero voltage switching of the main and auxiliary switches to regulate the output voltage delivered to the load;

wherein the power converter is configured so that the resonant capacitor handles more than half of a power requirement of the load and the transformer handles less than half of the power requirement of the load.

2. The power converter of claim 1 wherein the control circuitry allows operation of the power converter at more than one input voltage.

3. The power converter of claim 2 wherein the power converter is configured so that the resonant capacitor handles about ¾ of the converter's rated power at a first input voltage that is lower than a second input voltage, and the transformer handles about ¼ of the power converter's rated power at the first input voltage.

4. The power converter of claim 3 wherein the power converter is configured so that the resonant capacitor handles about 90% of the converter's rated power at a second input voltage that is higher than the first input voltage, and the transformer handles about 10% of the power converter's rated power at the second input voltage.

5. The power converter of claim 1 wherein the control circuitry operates the main switch and the auxiliary switch through a sequence of five modes.

6. The power converter of claim 5 wherein, in a first mode:
the main switch is turned on as a zero voltage switching event, and the auxiliary switch is off;
a primary current initially circulates in a direction that allowed zero voltage turn on of the main switch and subsequently reverses; and
no current flows from the secondary winding.

7. The power converter of claim 6 wherein, in a second mode:
the main switch is turned off, and the auxiliary switch remains off;
the primary current reverses because of the turn off of the main switch causing a current to flow through the auxiliary switch that facilitates zero voltage turn on of the auxiliary switch; and
current flows from the secondary winding to the load.

8. The power converter of claim 7 wherein in the second mode the primary current is quasi-sinusoidal and diverges from a substantially linear magnetizing current of the transformer.

9. The power converter of claim 8 wherein, in a third mode:
the main switch remains off, and the auxiliary switch is turned on as a zero voltage switching event;
the primary current reverses because of the turn on of the main switch; and
current continues to from the secondary winding to the load.

10. The power converter of claim 9 wherein in the third mode the primary current is quasi-sinusoidal and continues to diverge from a substantially linear magnetizing current of the transformer, before again converging to equal the magnetizing current of the transformer.

11. The power converter of claim 10 wherein, in a fourth mode:
the main switch remains off, and the auxiliary switch remains on;
the primary current decreases to a negative value that will facilitate zero voltage turn on of the main switch; and
no current flows from the secondary winding to the load.

12. The power converter of claim 11 wherein, in a fifth mode:
the main switch and the auxiliary switch are off;
a primary current driven by resonant operation of the resonant circuit circulates in a direction that allows zero voltage turn on of the main switch; and
no current flows from the secondary winding.

13. A power converter comprising:
a switching arrangement, including a main switch and an auxiliary switch, coupled to an input voltage;
a series resonant circuit coupled to the switching arrangement, the series resonant circuit comprising a resonant capacitor and a primary winding of a transformer;
an output coupled to a secondary winding of the transformer by a rectifier, the output delivering a regulated output voltage to a load; and
control circuitry that operates the main switch and the auxiliary switch substantially complementarily as a forward converter to regulate the output voltage delivered to the load, wherein the control circuitry cycles the main switch and the auxiliary switch through a plurality of switching modes, including:
at least one mode in which the main switch and the auxiliary switch are off, and a primary current driven by resonant operation of the resonant circuit circulates in a direction that allows zero voltage turn on of the main switch; and
at least one mode in which the main switch and the auxiliary switch are off, and a driven by resonant operation of the resonant circuit circulates in a direction that allows zero voltage turn on of the auxiliary switch;
wherein the power converter is configured so that the resonant capacitor handles more than half of a power requirement of the load and the transformer handles less than half of the power requirement of the load.

14. The power converter of claim 13 wherein the power converter is configured so that the resonant capacitor handles about ¾ of the converter's rated power, and the transformer handles about ¼ of the power converter's rated power at an input voltage.

15. The power converter of claim 13 wherein the power converter is configured so that the resonant capacitor handles about 90% of the converter's rated power, and the transformer handles about 10% of the power converter's rated power at an input voltage.

16. The power converter of claim 13 wherein the control circuitry allows operation of the power converter at more than one input voltage.

17. The power converter of claim 13 wherein the converter is an AC-DC converter and the input voltage is a rectified AC voltage.

18. A method of operating a main switch and an auxiliary switch of a forward mode resonant power converter that includes a resonant capacitor that resonates with a primary winding of a transformer to form a resonant circuit, the method comprising cycling the main switch and the auxiliary switch through a sequence of modes including:
a first mode in which:
the main switch is turned on as a zero voltage switching event, and the auxiliary switch is off;
a primary winding current initially circulates in a direction that allowed zero voltage turn on of the main switch and subsequently reverses; and
no current flows from a secondary winding of the transformer;
a second mode in which:
the main switch is turned off, and the auxiliary switch remains off;

the primary winding current reverses because of the turn off of the main switch causing a current to flow through the auxiliary switch that facilitates zero voltage turn on of the auxiliary switch; and current flows from the secondary winding to a load;

a third mode in which:
  the main switch remains off, and the auxiliary switch is turned on as a zero voltage switching event;
  the primary winding current reverses because of the turn on of the main switch; and
  current continues to from the secondary winding to the load a fourth mode in which:
  the main switch remains off, and the auxiliary switch remains on;
  the primary winding current decreases to a negative value that will facilitate zero voltage turn on of the main switch; and
  no current flows from the secondary winding to the load;

and a fifth mode in which:
  the main switch and the auxiliary switch are off;
  the primary winding current is driven by resonant operation of the resonant circuit circulates in a direction that allows zero voltage turn on of the main switch; and
  no current flows from the secondary winding.

19. The method of claim 18 wherein:
in the second mode the primary winding current is quasi-sinusoidal and diverges from a substantially linear magnetizing current of the transformer; and
wherein in the third mode the primary winding current is quasi-sinusoidal and continues to diverge from a substantially linear magnetizing current of the transformer, before again converging to equal the magnetizing current of the transformer.

* * * * *